UNITED STATES PATENT OFFICE.

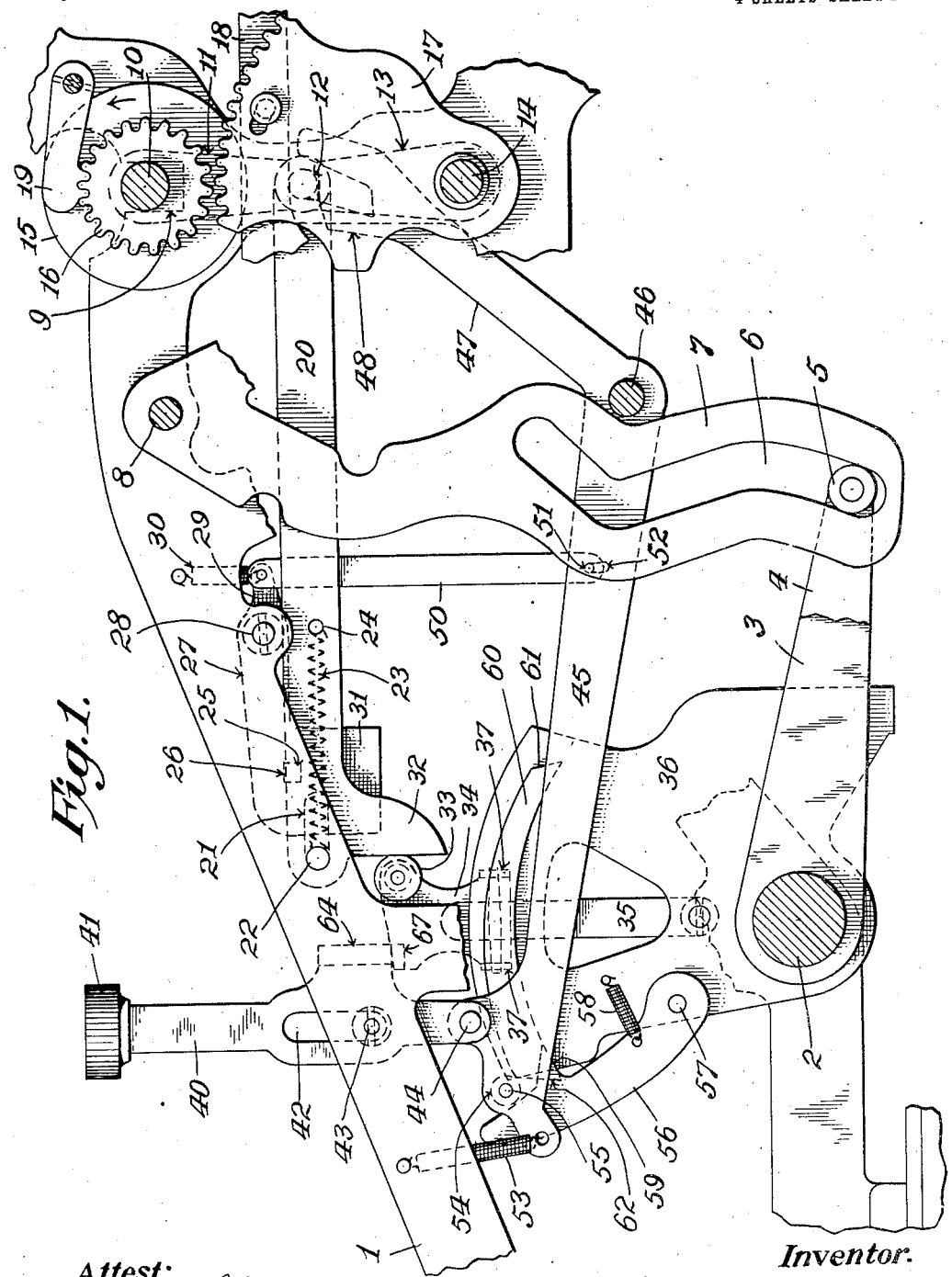

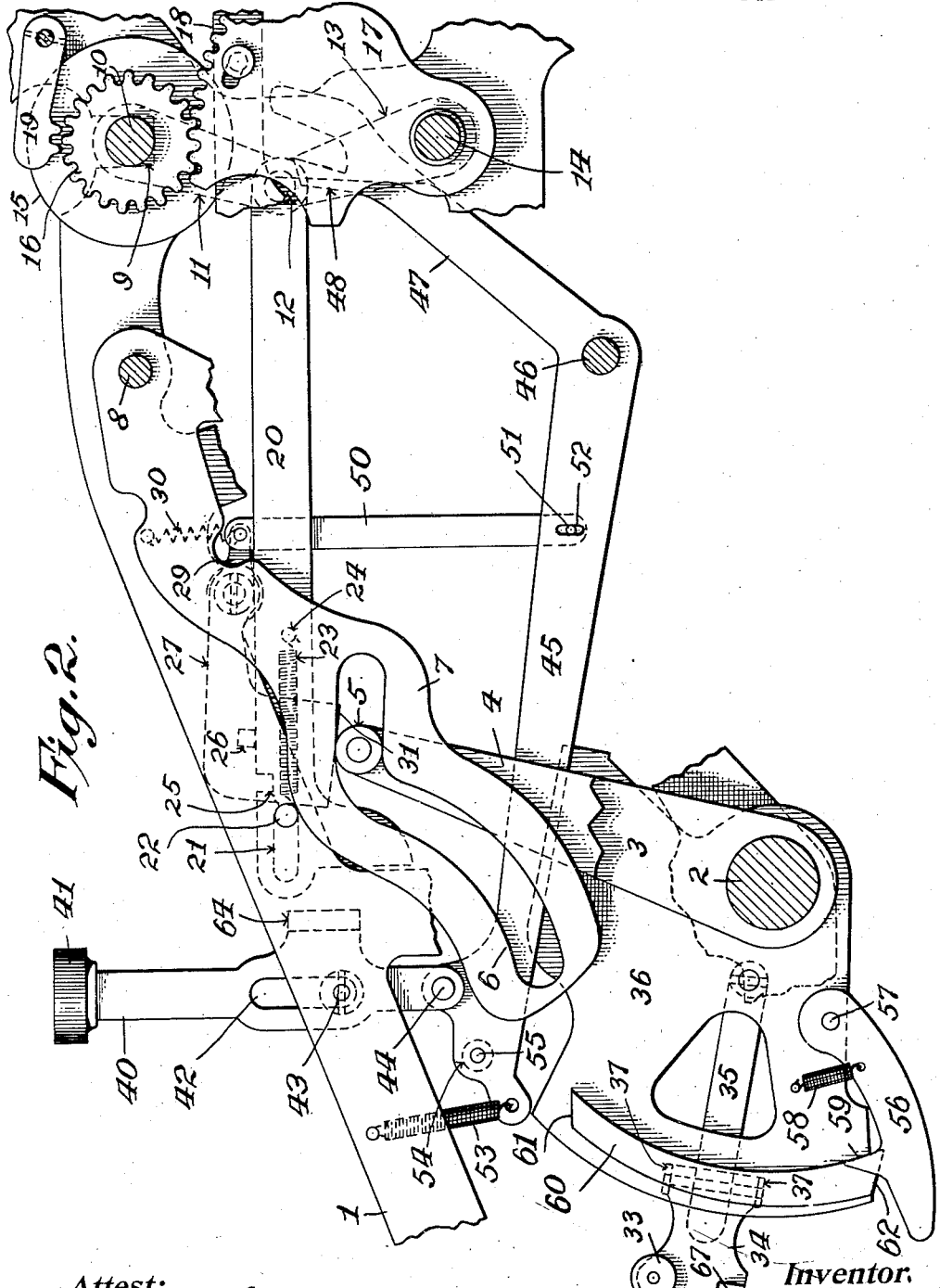

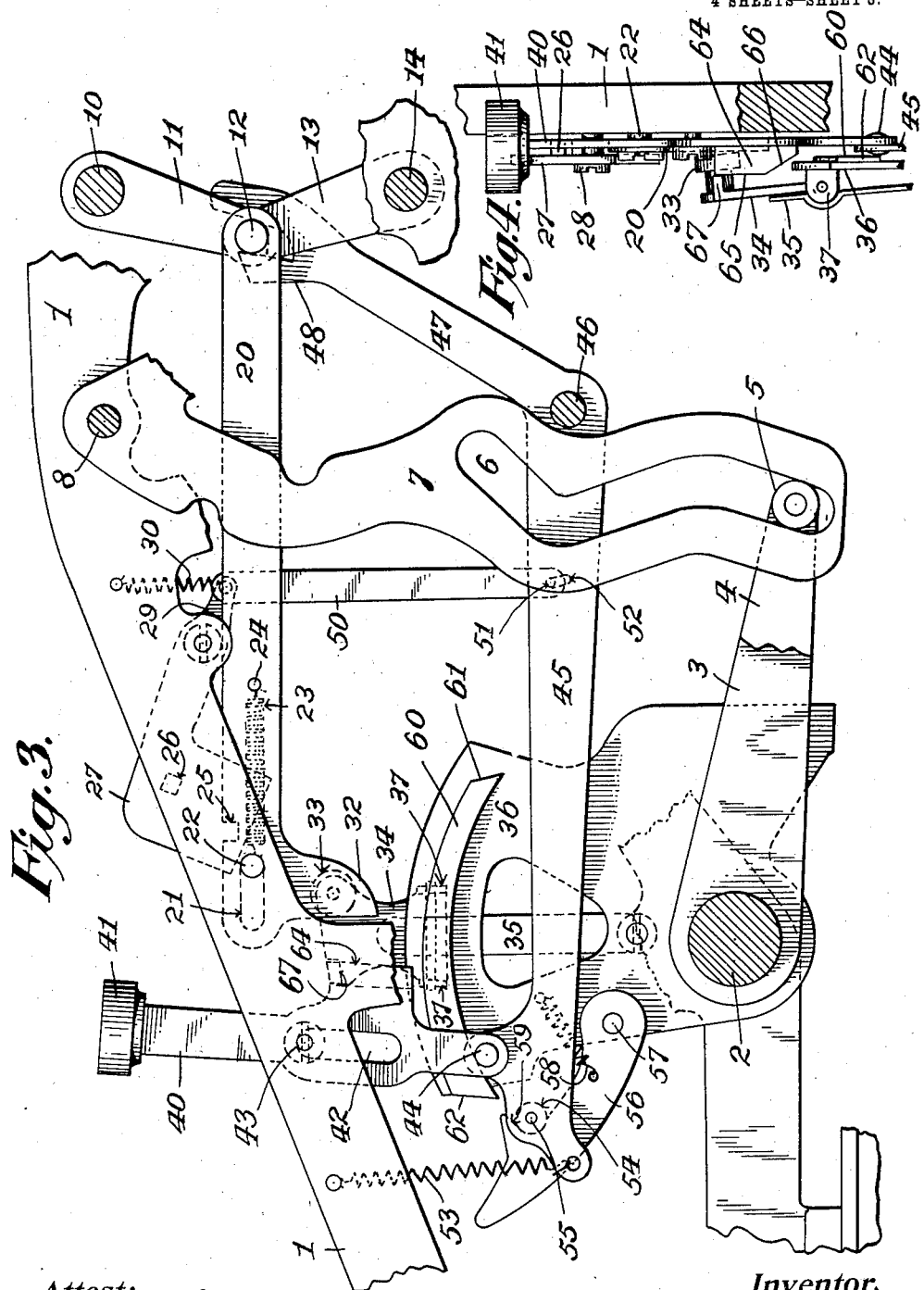

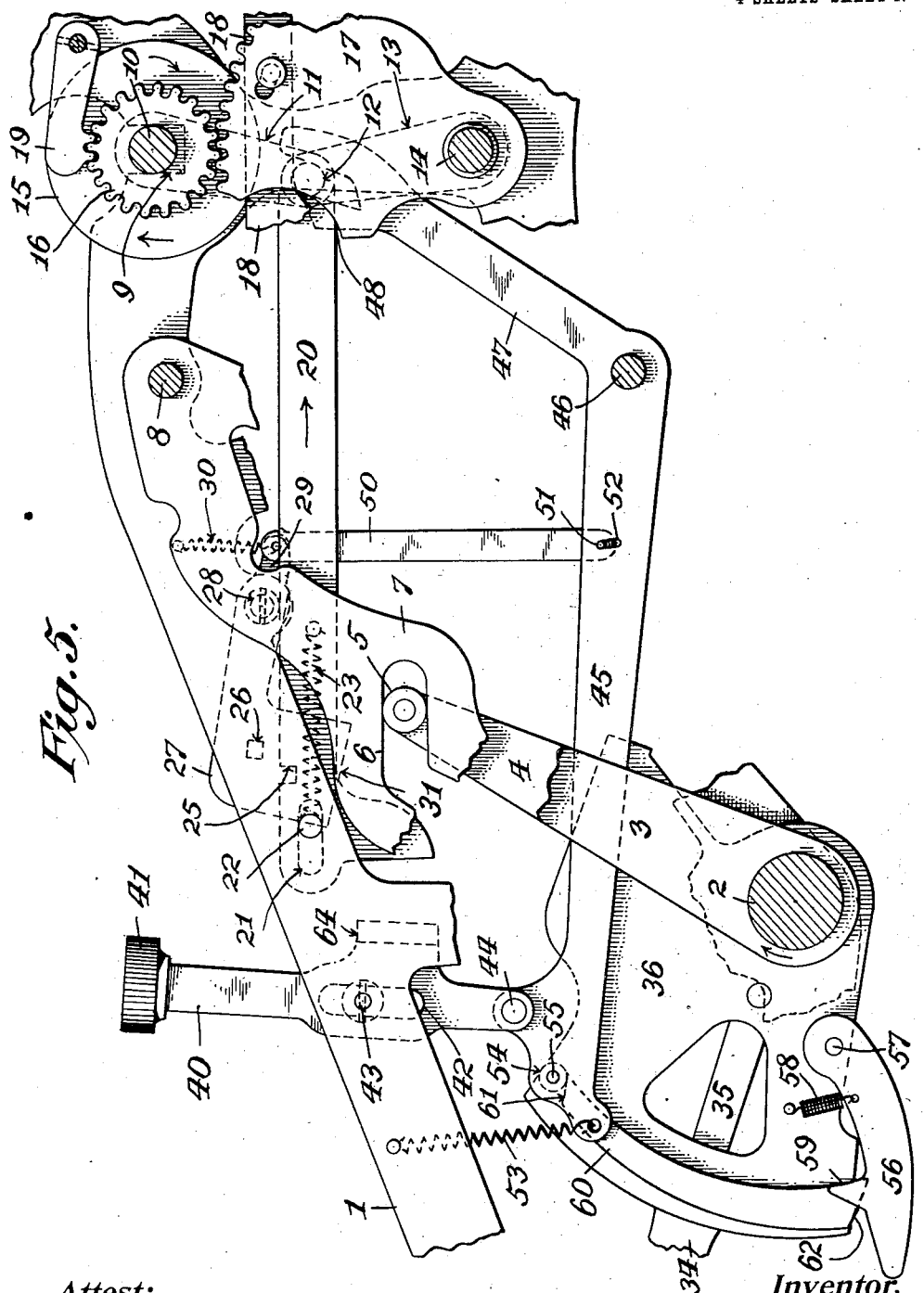

HENRY KÜNTZLER, OF KINGSTON, PENNSYLVANIA, ASSIGNOR TO JOHN P. HUNTER, OF WILKES-BARRE, PENNSYLVANIA.

NUMERAL-WHEEL SUPPORT FOR ADDING-MACHINES.

1,068,786.  Specification of Letters Patent.  Patented July 29, 1913.

Application filed July 22, 1908. Serial No. 444,836.

*To all whom it may concern:*

Be it known that I, HENRY KÜNTZLER, a citizen of the United States, and resident of Kingston, Luzerne county, Pennsylvania, have invented certain new and useful Improvements in Numeral-Wheel Supports for Adding-Machines, of which the following is a specification.

My invention relates to numeral wheel supports for adding machines, and its novelty consists in the construction and adaptation of the parts as will be more fully hereinafter pointed out.

The machine to which the invention is specifically adapted is the well known Wales adding machine, in which, in the usual operation of the machine, it is necessary to lower the numeral wheel shaft in order to secure a proper engagement between the numeral wheel pinions and their actuating mechanism and automatically to raise the same shaft to insure a disengagement between such parts at the end of an enumerating and accumulating operation. I have devised a novel method of accomplishing this purpose, and one which is more simple in construction and more economical to make than that which has heretofore been so employed.

In the drawings, Figure 1 is a side elevation of a portion of an adding machine embodying my invention with the numeral wheel shaft elevated and the main shaft not yet actuated; Fig. 2 is a similar view at the end of the forward stroke of the main shaft showing the numeral wheel shaft lowered; Fig. 3 is a similar view showing the relation of the total key to the numeral wheel support; Fig. 4 is a detail edge view of some of the parts shown in Fig. 3; and Fig. 5 is a view similar to Fig. 3 but showing the parts in different positions.

In the drawings, 1 is the frame of the machine, 2 is the main shaft mounted in suitable bearings therein. Mounted on each side of the machine and secured to the main shaft are cranks 3 and 4, each carrying rollers 5. The roller 5 on the crank 4 moves in a slot 6 in a lever 7, the other end of which is secured to a rocking shaft 8 arranged transversely across the machine.

The lever 7, shaft 8 and connected parts serve to actuate the accumulating and carrying mechanisms which form no part of the subject matter of this application but are described and claimed in co-pending applications. The roller 5 on the crank serves to engage the latch 27 hereinafter referred to. On each side of the frame of the machine are vertical recesses 9 adapted to receive the numeral wheel shaft 10 which reciprocates therein as hereinafter described.

Secured to and depending from the shaft 10 on each side thereof and outside of the frame of the machine are toggle links 11, each provided at their lower ends with outwardly extending pivots 12 to each of which is secured a toggle lever 13, which levers are loosely mounted on a fixed shaft 14 arranged across the machine.

It will be understood that numeral wheels 15 arranged in denominational series are loosely mounted on the shaft 10. They are each provided with pinions 16 and each actuated by segment gears 17, one for each wheel, and which are loosely mounted on the transverse shaft 14. The segment gears moved by control bars, indicated at 18, and fixed detents 19 serve to position the numeral wheel pinion 16 when they are not engaged by their respective gears. The manner of controlling and actuating the numeral wheels is explained in the applications for patents above referred to.

Secured to the pivots 12, one on each side of the machine, are operating levers 20, each provided with a slot 12 adapted to engage a pin 22 secured to the frame of the machine and supporting the lever against the force of gravity. A spring 23 secured to the pin 22 and to a pin 24 projecting from the lever tends constantly to move the latter toward the left in Fig. 1. The lever is provided with a notch 25 adapted to serve as a catch to receive a latch pin 26 of a latch piece 27 mounted to oscillate on a pivot 28 projecting from the frame 1. It is provided with a tail 29 to which is attached a spring 30, the other end of which is secured to the frame of the machine and which tends constantly to move the latch pin 26 toward the lever 20. Depending from the tail 29 is a link 50 hereinafter referred to. A member 31 depends from the latch piece 27 and is adapted to be engaged by the rollers 5 on the cranks 3 and 4 at the end of the forward stroke of the main shaft. Depending from the lever 20 is a projection 32 adapted to be engaged by a roller 33 mounted on a carrier 34 pivoted to the sector 36 between lugs 37. A flat spring 35 secured to the sector 36 is adapted to press against the carrier 34 to keep it in the same vertical plane as the projection 32 on the lever 20.

Normally the numeral shaft is in its uppermost position and the pinions of the numeral wheels engage the fixed detents 19. In the operation of enumerating an item the keys of the machine are depressed and the control levers are moved to positions corresponding to the depressed keys and the segment gears 17, moving with them, are moved distances proportioned to the digits displayed on the depressed keys. These operations take place during the forward stroke of the main shaft and at the conclusion of such stroke the numeral wheel shaft should be lowered to bring the pinions of the numeral wheels into mesh with the segment gears so that as the latter are oscillated during the rearward stroke of the main shaft the wheels are rotated to accumulate the items enumerated. At the conclusion of such stroke the numeral wheel shaft should be again elevated in order that the parts should be ready for a new cycle of operations.

Normally and before the main shaft is oscillated, the parts are in the positions shown in Fig. 1 in which it will be observed the numeral wheel shaft is elevated, the toggle links and levers are in a vertical line, the lever is at its extreme position to the right and is held against the tension of its spring 23 because the latch pin 26 is in the notch 25. When the main shaft 2 is oscillated, at the end of its forward stroke, the parts assume the positions shown in Fig. 2.

The rollers 5 on the ends of the cranks 3 and 4 are brought to contact with the under surfaces of the members 31 of the latch pieces 27 and simultaneously lift the latter disengaging the pins 26 from the notches 25. The moment this disengagement takes place the springs 23 quickly pull the levers 20 toward the left moving with them the toggle links 11 and toggle levers 13 causing the numeral wheel shaft 10 to descend to the bottom of the recesses 9, when the numeral wheel pinions 16 will at once be in proper mesh with the teeth of the segment gears 20. This engagement of the numeral wheel pinions and their gears remains until the end of the rearward stroke of the main shaft when the roller 33 mounted on the carrier 34 is, by the oscillation of the sector 36, brought to contact against the left edge of the projection 32 of the lever 30 bodily moving the latter toward the right, stretching the spring 23, straightening the toggle links and levers and thus elevating the numeral wheel shaft, until the latch pin 26, under the influence of the spring 31 and of gravity, falls into the notch 25 and thus maintains the parts in their normal positions.

When a total is to be recorded on the machine it is necessary to cause an immediate engagement between the numeral wheel pinions and their segment gears at the beginning of the forward stroke of the main shaft in order that the wheels shall be rotated backward during such stroke. To that end the numeral wheel shaft must be immediately lowered at the beginning of such stroke.

A totalizing key 40, provided with the usual tip 41 and the stem of which is slotted at 42 to engage a guide pin 43 projecting from the frame of the machine, is pivoted at 44 at its lower end to a longitudinally arranged total lever 45 which is secured to a cross shaft 46 to which in turn are secured two upwardly extending levers 47 provided with forks 48 adapted to engage the pivots 12 of the toggle links and levers. A link 50 connects the tail 29 of the latch piece 27 with the lever 45, a pin 51 on the link 50 and a slot 52 in the lever 45 permits the latch 27 to be moved by the roller 5 without affecting the lever 45 (see Fig. 2). A spring 53 secured to the lever 45 and to a fixed point on the frame serves, constantly, to keep the totalizing key up. This spring is not, however, as strong as the spring 23. A roller 54 mounted on a pivot 55 projecting from the lever 45 is adapted to engage the curved surface of a latch arm 56 pivoted at 57 to the sector 36 and constantly drawn toward the right by a spring 58. The latch arm 56 is provided with a latch finger 59 projecting toward the right. On the face of the sector 36 is a circular flange 60 provided with a terminal cam face 61 at its right end and a locking face 62 at its left end. On the side of the stem of the totalizing key 40 is a lug 64 provided with a vertical straight surface 65 and a sloping cam surface 66. This is adapted to engage and coöperate with a projection 67 on the carrierr 34 as will presently be explained.

When the totalizing key 40 is depressed the lever 45 is moved downward and the forked levers 47 are moved upward to engage the toggle joint pins 12, the link 50 is pulled downward, the latch piece 27 is oscillated and the pin 26 is disengaged from the notch 25, whereupon the spring 23 moves the lever 20 toward the left so that the toggle links and levers are moved out of line and at an angle to each other and the numeral wheel shaft descends to permit the numeral wheel pinions to engage their respective gears. Practically simultaneously with this operation, as the totalizing key stem is depressed, the roller 54 moves against the latch arm 56 passing by the locking face 62 of the flange 60 on the sector 36 and over the tip of the finger 59 until it is beneath the latter where it remains. At the same time, the sloping surface 66 on the lug 64 of the totalizing key 40 in its downward movement has engaged the projection 67 on the carrier 34 and moved the latter out of the plane of movement of the lever 20 (see Fig. 4) to allow the latter to move to the left. The parts are now in the position shown in Fig. 3. The main shaft being oscillated the lower edge of the circular flange 60 is moved over the roller 54 which, until that time, has been held by the finger 64. This engagement with the flange 60 holds the total key depressed during the forward stroke of the main shaft. At the end of this stroke the circular flange 60 will have entirely passed the roller 54 (see Fig. 5) and, under the influence of the spring 53, the lever 45 will be slightly lifted so that the roller 54 will mount to the cam surface 61 of the flange 60 and, during the rearward stroke of the main shaft, the upper surface of this flange 60 positively lifts the roller 54 and lever 45, and the latter, acting upon the forked levers 47, straightens the toggle joint and lifts the numeral wheel shaft to its normal position, at the same time charging the spring 23. The reëngagement of the pin 26 with the notch 25 on the lever 20 is permitted by the movement of the lever 45 allowing the link 50 to rise under the influence of the spring 30. The total key 40 is simultaneously lifted also to its original position. In the operation of taking a subtotal, the numeral wheels are brought into mesh with the actuating racks upon the first movement of the handle and are kept in such relation during the movement of the handle throughout both backward and forward strokes. The particular mechanism employed for this purpose is not shown in the drawings, as it is well known in the art and forms no part of the present invention. Such mechanism is disclosed, for example, in patent of McFarland, No. 842,232, issued January 29, 1907.

What I claim as new is:—

1. In combination, a shaft bearing numeral wheels, operating means for the wheels, a second shaft on which the operating means is mounted, toggle members adapted to bring into engagement the said wheels and operating means, said toggle members being directly connected to the respective shafts, and operating means for the toggles.

2. In an adding machine, a numeral wheel shaft including pinions, pinion actuating means, a toggle joint to raise and lower the said shaft in relation to said pinion actuating means, means for moving the joint to a locking and unlocking position comprising a bar, means for restraining the movement of said bar, and means for tripping the restraining means.

3. In combination, a shaft bearing numeral wheels, operating means for the wheels, a second shaft on which the operating means is mounted, toggle members adapted to bring into engagement the said wheels and operating means, said toggle members being directly connected to the respective shafts, and mechanism including a spring and a bar having connection with and adapted to operate the toggle members.

4. In a machine of the character described, a main shaft, a series of numeral wheels, actuating means therefor, means whereby the said wheels may be normally kept disengaged from said actuating means, engaging means, and means comprising a latch and catch whereby the engaging means may be detained against actuation during a part of the movement of the main shaft.

5. A numeral wheel shaft, means adapted normally to support the shaft comprising an arm adapted to hold the same against the force of gravity, in combination with means for moving the arm including a bar, a spring whereby it is moved, means whereby it is moved against the tension of the spring and means adapted to detain it in such position.

6. A numeral wheel shaft, means adapted normally to support the shaft comprising an arm adapted to hold the same against the force of gravity, in combination with means for moving the arm including a bar, a spring whereby it is moved, means whereby it is moved against the tension of the spring and means adapted to detain it in such position, including a catch on the bar and a latch adapted to coöperate therewith.

7. A numeral wheel shaft, a main shaft, means adapted normally to support the numeral wheel shaft comprising an arm adapted to hold the same against the force of gravity, in combination with means for moving the arm including a bar, a spring whereby it is moved, means for charging the spring from the oscillation of the main shaft and means adapted to detain the bar against the tension of the charged spring.

8. A numeral wheel shaft, a main shaft, means adapted normally to support the numeral wheel shaft comprising an arm adapted to hold the same against the force of gravity, in combination with means for moving the arm including a bar, a spring whereby it is moved, means for charging the spring from the oscillation of the main shaft and means adapted to detain the bar against the tension of the charged spring, including a catch on the bar and a latch adapted to coöperate therewith.

9. In combination, a main shaft, a device oscillating in unison therewith, a numeral wheel shaft, numeral wheels carried thereon, actuating means for said numeral wheels, a support for said shaft, means whereby the support is moved to throw the said numeral wheels into or out of engagement with said actuating means, and a spring for moving the wheels into engagement.

10. In a machine of the character described, comprising a main shaft, a device oscillating in unison therewith, a numeral wheel shaft, a support therefor, means whereby the support is raised or lowered, a spring for moving the latter to lower the numeral wheel shaft and a connection between it and the oscillating device whereby said shaft may be raised and the spring charged with energy.

11. In a machine of the character described, comprising a main shaft, a device oscillating in unison therewith, a numeral wheel shaft, a support therefor, consisting of an arm, a lever adapted to move said arm, a spring adapted to move the lever and a connection between the oscillating device and the lever to move it against its spring.

12. In a machine of the character described comprising a main shaft, a numeral wheel shaft, a support therefor, a lever adapted to move the support, a spring adapted to move the lever and means actuated from the main shaft adapted to retract the lever against the force of its actuating spring.

13. In a machine of the character described, comprising a main shaft, a numeral wheel shaft, a support therefor, a lever adapted to move the support, a spring adapted to move the lever and a latch adapted to hold the lever against movement.

14. In a machine of the character described, comprising a main shaft, a numeral wheel shaft, a support therefor, a lever adapted to move the support, a spring adapted to move the lever and a catch on the lever and a latch adapted to engage therewith to hold the lever against movement.

15. In a machine of the character described, comprising a main shaft, a numeral wheel shaft, a support therefor, a lever adapted to move the support, a spring adapted to hold the lever against movement, and means actuated from the main shaft adapted to release the latch.

16. In a machine of the character described, comprising a main shaft, a numeral wheel shaft, a support therefor, a lever adapted to move the support, a spring adapted to move the lever and a catch on the lever and a latch adapted to engage therewith to hold the lever against movement, and means actuated from the main shaft adapted to release the latch.

17. In a machine of the character described, comprising a main shaft, a numeral wheel shaft, a support therefor, a lever adapted to move the support, a spring adapted to move the lever and a device adapted to detain the lever against such movement.

18. In a machine of the character described, comprising a main shaft, a numeral wheel shaft, a support therefor, a lever adapted to move the support, a spring adapted to move the lever and a device adapted to detain the lever against such movement until the end of the forward stroke of the main shaft.

19. In a machine of the character described, comprising a main shaft, a numeral wheel shaft, a support therefor, a lever adapted to move the support, a spring adapted to move the lever and a device adapted to detain the lever against such movement, including a notch on the lever and a latch adapted to coöperate therewith.

20. In a machine of the character described, comprising a main shaft, a numeral wheel shaft, a support therefor, a lever adapted to move the support, a spring adapted to move the lever and a device adapted to detain the lever against such movement in combination with means for releasing it.

21. In a machine of the character described, comprising a main shaft, a numeral wheel shaft, a support therefor, a lever adapted to move the support, a spring adapted to move the lever and a device adapted to detain the lever against such movement in combination with means for releasing it at the end of the former stroke of the main shaft.

22. In a machine of the character described, comprising a main shaft, a numeral wheel shaft, a support therefor, a lever adapted to move the support, a spring adapted to move the lever and a device adapted to detain the lever against such movement in combination with means for releasing it, including a crank oscillating in unison with the main shaft.

23. In a machine of the character described, comprising a main shaft, a numeral wheel shaft, a support therefor, a lever adapted to move the support, a spring adapted to move the lever and a device adapted to detain the lever against such movement, including a notch on the lever and a latch adapted to coöperate therewith in combination with means for releasing it.

24. In a machine of the character described, comprising a main shaft, a numeral wheel shaft, a support therefor, a lever adapted to move the support, a spring adapted to move the lever and a device adapted to detain the lever against such movement, including a notch on the lever and a latch adapted to coöperate therewith in combination with means for releasing it, including a crank oscillating in unison with the main shaft.

25. In a machine of the character described, comprising a main shaft, a numeral wheel shaft, a toggle joint support therefor, a lever adapted to bend and straighten the toggle and a spring attached to and adapted to move the lever.

26. In a machine of the character described, comprising a main shaft, a numeral wheel shaft, a toggle joint support therefor, a lever adapted to bend and straighten the toggle and a spring adapted to move the lever and a latch adapted to hold the lever against movement.

27. In a machine of the character described, comprising a main shaft, a numeral wheel shaft, a toggle joint support therefor, a lever adapted to bend and straighten the toggle and a spring adapted to move the lever and a catch on the lever and a latch adapted to engage therewith to hold the lever against movement.

28. In a machine of the character described, comprising a main shaft, a numeral wheel shaft, a toggle joint support therefor, a lever adapted to bend and straighten the toggle and a spring adapted to move the lever and a latch adapted to hold the lever against movement, and means actuated from the main shaft adapted to release the latch.

29. In a machine of the character described, comprising a main shaft, a numeral wheel shaft, a toggle joint support therefor, a lever adapted to bend and straighten the toggle and a spring adapted to move the lever and a latch adapted to hold the lever against movement, and means actuated from the main shaft adapted to release the latch, including a crank oscillating in unison with the main shaft.

30. In a machine of the character described comprising a main shaft, a numeral wheel shaft, a toggle joint support therefor, a lever adapted to bend and straighten the toggle and a spring adapted to move the lever to bend the toggle at the end of the forward stroke of the main shaft.

31. In a machine of the character described, comprising a main shaft, a numeral wheel shaft, a toggle joint support therefor, a lever adapted to bend and straighten the toggle and a spring adapted to move the lever to bend the toggle at the end of the forward stroke of the main shaft and means adapted normally to detain the lever against such movement.

32. In a machine of the character described, comprising a main shaft, a numeral wheel shaft, a toggle joint support therefor, a lever adapted to bend and straighten the toggle and a spring adapted to move the lever to bend the toggle at the end of the forward stroke of the main shaft and means adapted normally to detain the lever against such movement, including a notch on the lever and a latch adapted to coöperate therewith.

33. In a machine of the character described, comprising a main shaft, a numeral wheel shaft, a toggle joint support therefor, a lever adapted to bend and straighten the toggle and a spring adapted to move the lever to bend the toggle at the end of the forward stroke of the main shaft and means adapted normally to detain the lever against such movement, including a notch on the lever and a latch adapted to coöperate therewith, in combination with means for releasing it.

34. In a machine of the character described, comprising a main shaft, a numeral wheel shaft, a toggle joint support therefor, a lever adapted to bend and straighten the toggle and a spring adapted to move the lever to bend the toggle at the end of the forward stroke of the main shaft and means adapted normally to detain the lever against such movement, including a notch on the lever and a latch adapted to coöperate therewith, in combination with means for releasing it, including a crank moving in unison with the main shaft and adapted to engage the latch.

35. In a machine of the character described, comprising a main shaft, a numeral wheel shaft, a toggle joint support therefor, a lever adapted to bend and straighten the toggle and a spring adapted to move the lever to bend the toggle at the end of the forward stroke of the main shaft and means adapted normally to detain the lever against such movement, including a notch on the lever and a latch adapted to coöperate therewith, in combination with means for releasing it, including a crank moving in unison with the main shaft and adapted to engage the latch and means for restoring the lever to its original position.

36. In a machine of the character described, comprising a main shaft, a numeral wheel shaft, a toggle joint support therefor, a lever adapted to bend and straighten the toggle and a spring adapted to move the lever to bend the toggle at the end of the forward stroke of the main shaft and means adapted normally to detain the lever against such movement, including a notch on the lever and a latch adapted to coöperate therewith, in combination with means for releasing it, including a crank moving in unison with the main shaft and adapted to engage the latch and means for restoring the lever to its original position, including a device moved from the main shaft.

37. In a machine of the character described, comprising a main shaft, a numeral wheel shaft, a support therefor, a lever adapted to move the support, a spring adapted to move the lever and devices detaining the lever against the action of its spring, a totalizing key and a connection between it and the detaining devices.

38. In a machine of the character described, comprising a main shaft, a numeral wheel shaft, a support therefor, a lever adapted to move the support, a spring adapted to move the lever and devices detaining the lever against the action of its spring, a totalizing key and a connection between it and the detaining devices comprising a lever and a link.

39. In a machine of the character described comprising a main shaft, a numeral wheel shaft, a support therefor, a lever adapted to move the support, a spring adapted to move the lever, and means for restoring the lever including a device moving in unison with the main shaft, a totalizing key and means operated by it to interrupt the function of the restoring device.

40. In a machine of the character described, comprising a main shaft, a numeral wheel shaft, a support therefor, a lever adapted to move the support, a spring adapted to move the lever, and means for restoring the lever to its original position including a device moving in unison with the main shaft, a totalizing key and means operated by it to interrupt the function of the restoring device, including means for moving the restoring device out of the plane of movement of the lever.

41. In a machine of the character described, comprising a main shaft, a numeral wheel shaft, a support therefor, a lever adapted to move the support, a spring adapted to move the lever, and means for restoring the lever to its original position including a device moving in unison with the main shaft, a totalizing key and means operated by it to interrupt the function of the restoring device, including a cam whereby the restoring device is moved out of the plane of movement of the lever.

42. In a machine of the character described, comprising a main shaft, a numeral wheel shaft, a support therefor, a lever adapted to move the support, a spring adapted to move the lever and devices detaining the lever against the action of its spring, a totalizing key, a lever adapted to be moved thereby, a connection between it and the lever detaining mechanism and a second connection between it and the numeral wheel shaft support.

43. In a machine of the character described, comprising a main shaft, a numeral wheel shaft, a support therefor, a lever adapted to move the support, a spring adapted to move the lever and devices detaining the lever against the action of its spring, a totalizing key, a lever adapted to be moved thereby to interrupt the function of the detaining mechanism and mechanism connected therewith positively to restore the numeral wheel support to its original position.

44. In a machine of the character described, comprising a main shaft, a numeral wheel shaft, a support therefor, a lever adapted to move the support, a spring adapted to move the lever and devices detaining the lever against the action of its spring, a totalizing key and means whereby it is automatically held depressed during a portion of the oscillation of the main shaft.

45. In a machine of the character described, comprising a main shaft, a numeral wheel shaft, a support therefor, a lever adapted to move the support, a spring adapted to move the lever and devices detaining the lever against the action of its spring, a totalizing key and means whereby it is automatically held depressed during a portion of the oscillation of the main shaft, consisting of a flanged sector moving with the main shaft and a roller adapted to engage the same moving with the sector.

46. In a calculating machine, the combination of a plurality of shafts disposed horizontally and positioned in the same vertical plane, a plurality of arms connected with each shaft and jointed to each other whereby the movement of said arms causes a reciprocal movement of one shaft toward the other.

47. In a calculating machine, the combination of a bearing shaft, a numeral wheel shaft disposed parallel thereto, guides for said numeral wheel shaft, and a toggle connected with each shaft adapted to reciprocate the numeral wheel shaft in the plane of the two shafts.

48. In a calculating machine, a bodily movable numeral wheel shaft, arms connected to said shaft, a bearing support, a second set of arms connected to said support, the two sets of arms being pivoted to each other to form a toggle joint, the parts being disposed to allow the said shaft, the said support, and the said toggle joint to lie in the same plane.

49. In a calculating machine, a shaft bodily movable in substantially a vertical direction, numeral wheels mounted on said shaft, locking means for said wheels positioned above said shaft, actuating means for said wheels positioned below said shaft, and a toggle joint adapted to raise said shaft when the joint is straightened and to lower it when the joint is broken.

50. In a calculating machine, a shaft, numeral wheels mounted on the shaft, locking means for said wheels, actuating means for said wheels, the said shaft being movable in two directions to bring the numeral wheels into engagement with the said locking means or into engagement with the said actuating means, and means to move said shaft including a toggle connected directly thereto.

51. In a calculating machine, a numeral wheel shaft, pinions mounted thereon, a second shaft positioned parallel to the numeral wheel shaft, sectors mounted on said second shaft and adapted to engage said pinions, and toggle arms joining the two shafts and adapted to move the pinions into and out of engagement with said sectors.

52. In a calculating machine, a shaft with numeral wheel pinions mounted thereon, a second shaft carrying actuating means for said pinions, swiveled arms connecting the two shafts and adapted to move the said pinions into and out of engagement with the said actuating means.

53. A calculating machine including a movable shaft, numeral wheels mounted thereon, locking means for said wheels, actuating means for said wheels, a supporting shaft for said actuating means, the two shafts, the locking means, and the line of engagement between the said wheels and said actuating means being located substantially in the same plane.

54. A calculating machine including a shaft, numeral wheels mounted thereon, locking means for said wheels positioned above said shaft, actuating means for said wheels positioned below said shaft, and a toggle adapted when in its locked position to hold the said wheels in engagement with the said locking means and out of engagement with the said actuating means.

55. A calculating machine including a shaft, numeral wheels mounted thereon, locking means for said wheels positioned above said shaft, actuating means for said wheels positioned below said shaft, a toggle adapted when in its locked position to hold the said wheels in engagement with the said locking means and out of engagement with the said actuating means, and means connected with said toggle tending to move it into its locked position.

56. A calculating machine including a shaft, numeral wheels mounted thereon, locking means for said wheels positioned above said shaft, actuating means for said wheels positioned below said shaft, a toggle adapted in its locked position to hold the said wheels in engagement with the said locking means and out of engagement with the said actuating means, and means including a bar and spring connected with said toggle tending to move it into its locked position.

57. A calculating machine including a shaft, numeral wheels mounted thereon, locking means for said wheels positioned above said shaft, actuating means for said wheels positioned below said shaft, a toggle adapted in its locked position to hold the said wheels in engagement with the said locking means and out of engagement with the said actuating means, mechanism connected with said toggle acting to move it into its locked position, and detaining means adapted to prevent such action.

58. A calculating machine including a shaft, numeral wheels mounted thereon, locking means for said wheels positioned above said shaft, actuating means for said wheels positioned below said shaft, a toggle adapted in its locked position to hold the said wheels in engagement with the said locking means and out of engagement with the said actuating means, mechanism connected with said toggle acting to move it into its locked position, detaining means to prevent such action, and tripping mechanism adapted to actuate said detaining means, thereby permitting the toggle to be moved into its locked position.

59. A calculating machine including a shaft, numeral wheel pinions mounted upon the shaft, pinion actuating means, toggle links adapted to cause the engagement and disengagement of said pinions and actuating means, and a plurality of means engaging said links and adapted to actuate the same.

60. A calculating machine including a shaft, numeral wheel pinions mounted upon the shaft, pinion locking means, toggle links adapted to cause the engagement and disengagement of said pinions and locking means, and a plurality of means engaging said links and adapted to actuate the same.

61. A calculating machine including a shaft, numeral wheel pinions mounted upon the shaft, pinion actuating means, pinion locking means, toggle links adapted to cause the respective engagement and disengagement with said pinions, of actuating means and locking means, and a plurality of means engaging said links and adapted to actuate the same.

62. A calculating machine including two parallel shafts, rotating members on each shaft adapted to engage each other, and means to vary the distance between the said shafts to effect an engagement or disengagement between the said members, said means including a toggle.

63. A calculating machine including two shafts, one disposed above the other, numeral wheel pinions mounted on the upper shaft, toothed sectors engaging said pinions mounted on the lower shaft, and a toggle joint connected directly to each shaft and adapted to reciprocate the upper shaft to and from the lower shaft.

64. A calculating machine including two shafts, one disposed above the other, numeral wheel pinions mounted on the upper shaft, toothed sectors engaging said pinions mounted on the lower shaft, fixed locking dogs positioned above said pinions, and a toggle joint connected directly to each shaft and adapted to reciprocate the upper shaft to and from the lower shaft.

Witness my hand this 27th day of June, 1908, at New York, N. Y.

HENRY KÜNTZLER.

Witnesses:
HERMAN MEYER,
WILLIAM R. BAIRD.